United States Patent [19]

Akkapeddi et al.

[11] Patent Number: 5,191,060
[45] Date of Patent: Mar. 2, 1993

[54] PREPARATION OF DODECANE TEREPHTHALAMIDE POLYMERS

[75] Inventors: Murali K. Akkapeddi, Morristown; Michael F. Cummings, Madison; Gerald J. Dege, Flanders, all of N.J.

[73] Assignee: Allied Signal

[21] Appl. No.: 818,192

[22] Filed: Jan. 8, 1992

[51] Int. Cl.$^5$ .............................................. C08G 69/28
[52] U.S. Cl. .................... 528/347; 528/324; 528/329.1; 528/338; 528/339; 528/340
[58] Field of Search ............... 528/347, 338, 339, 340, 528/324, 329.1

[56] References Cited

U.S. PATENT DOCUMENTS

| | | | |
|---|---|---|---|
| 2,752,328 | 6/1956 | Magat | 528/336 |
| 3,040,005 | 6/1962 | Bernhart et al. | 260/78 |
| 3,382,216 | 5/1968 | Blaschke et al. | 528/347 |
| 3,509,107 | 4/1970 | Brignac | 260/78 |
| 3,696,074 | 10/1972 | Tsuda et al. | 528/347 |
| 3,839,296 | 10/1974 | Campbell | 528/347 |
| 3,917,561 | 11/1975 | Chapman et al. | 528/347 |
| 4,760,129 | 7/1988 | Haering et al. | 528/335 |
| 4,863,991 | 9/1989 | Poppe et al. | 524/606 |

FOREIGN PATENT DOCUMENTS 410649  7/1990  European Pat. Off. .

Primary Examiner—Harold D. Anderson
Attorney, Agent, or Firm—Michael U. Lee; Roger H. Criss

[57] ABSTRACT

A process of preparing homopolymers and copolymers of dodecane terephthalamide having a high melting temperature and dimensional stability, comprising the steps of forming an aqueous suspension of a prepolymer comprising substantially equimolar diacid/diamine admixture of 1,12-dodecanediamine, terephthalic acid, and optionally at least one additonal comonomer in a reactor at a reaction temperature below the melting temperature of the resulting polyamide polymer; drying the prepolymer; and polycondensating the dried prepolymer in an extruder, particularly a vented single screw extruder, to form the polyamide polymer.

14 Claims, No Drawings

PREPARATION OF DODECANE TEREPHTHALAMIDE POLYMERS

BACKGROUND OF THE INVENTION

1. Field of the Invention

The present invention relates to a process of preparing polyamides having a high melting temperature; more particularly, the present invention relates to a process of preparing dodecane terephthalamide polymers.

2. Description of the Prior Art

Conventional aliphatic polyamide, commonly known as nylons, are semi-crystalline thermoplastic polymers that are noted for their useful properties such as chemical resistance, hardness, high tensile strength, toughness, rigidity and relatively high heat stability. However, conventional polyamides are hygroscopic, that is, they have a tendency to absorb moisture from their environment.

The polyamides derived from terephthalic acid and alkanediamines, which are commonly referred in the art as polyterephthalamides, have been known in the art to exhibit a high melting point and low moisture sensitivity. However, the high melting point of polyterephthalamides, which is higher than 300° C. and practically coincides with the thermal decomposition temperature of the polymers, renders the production of the polymers by the conventional melt polymerization process, which is the most widely used polyamide production process, unpracticable. Various publications recognize this polymerization difficulty. For example, U.S. Pat. No. 2,752,328 to Magat discloses a polyterephthalamide composition with a relatively low polymerization temperature, utilizing diaminoalkanes of 6 to 8 carbon atoms with one or two methyl side chains in place of the traditional straight chain diaminoalkanes. U.S. Pat. No. 3,382,216 to Blaschke et al. discloses a melt-processible, non-crystalline copolyamide of hexamethylene diamine and a mixture of isophthalic acid and terephthalic acid, having a softening point and melting point far below those of polyhexamethylene terephthalamide. U.S. Pat. NO. 3,696,074 to Tsuda et al. discloses terephthalamide copolymer compositions of dodecamethylene diamine, hexamethylene diamine, terephthalic acid and adipic acid, which copolyamides are crystalline and have a range of melting points between 200° C. and 280 ° C.

The difficulty in producing polyterephthalamides is further illustrated by U.S. Pat. No. 3,839,296 to Campbell and U.S. Pat. No. 3,917,561 to Chapman et al. Campbell discloses an elaborate melt polymerization procedure for producing dodecane terephthalamide copolymers, which utilizes a carefully monitored sequential polymerization process. Chapman discloses a process for producing dodecane terephthalamide polymers that comprises melt polymerizing cation-exchange treated dodecane terephthalamide salts in the presence of a sterically hindered phenol, benzenephosphinic acid, or acetate in combination with an alkali metal halide. The resulting polymer is said to be melt-stable and melt-spinnable by conventional processes into a useful yarn.

It is clear from the above disclosures that polyterephthalamides that exhibit the desirable properties are not readily produced by the conventional melt polymerization process unless elaborate measures are taken to guard against thermal degradation of the polymers. Therefore, it is desirable to have a practical manufacturing process for polyterephthalamides that can be readily utilized in a manufacturing environment of a commercial scale.

An alternate method of producing polyamide known in the art is continuous polycondensation processes utilizing a continuous reactor or an extruder. The continuous polycondensating reaction involves heating monomeric or prepolymeric starting materials to cause progressive polymerization with loss of low molecular weight volatile material until the resulting polymer achieves desired molecular weight. For example, U.S. Pat. No. 3,040,005 to Bernhardt et al discloses a method of producing nylon 6,6 and copolymers thereof by an extrusion polycondensation process, wherein an inert gas, such as nitrogen, must be supplied to the polycondensating extruder in order to facilitate the proper nylon polymerization. U.S. Pat. No. 4,760,129 to Haering et al. discloses a process of preparing nylon 6,6 in a twin screw extruder by providing serially arranged, alternatingly elevated and reduced zones for pressure and temperature within the extruder. European Patent Application 0 410 649 to Taylor et al discloses a process for producing polyamides of high molecular weight from dicarboxy terminated prepolymers of relatively low molecular weight by further polymerization in a twin screw extruder in the presence of a diamine monomer solution.

U.S. Pat. No. 4,863,991 to Poppe et al. discloses a copolymer composition of hexamethylene terephthalamide that is produced by a twin screw extruder, utilizing high shear mixing and venting capabilities of a twin screw extruder. Although the disclosure indicates that copolymers of hexamethylene terephthalamide can be produced by a twin screw extruder polycondensation process, dodecane terephthalamide polymers have not been produced by such a polycondensation process since the two polyamides do not have the same reaction characteristics. For example, the reaction of dodecane terephthalamide prepolymer formation is slower and the water solubility of dodecane terephthalamide prepolymers is lower than those of hexamethylene terephthalamide prepolymers. Consequently, the reaction of dodecane terephthalamide prepolymer formation requires a longer reaction time and significantly different pressure and temperature conditions.

The Poppe disclosure indicates that the polycondensation of hexamethylene terephthalamide polymers is achieved by a twin screw extruder. The use of a twin screw extruder is dictated by the fact that the viscosity of the prepolymer substrate mixture increases and the efficiency of the polycondensation process decreases as the polycondensation progresses, creating difficulties in the proper heat distribution in the reactor (extruder) and in the removal of the low molecular weight volatile. As a consequence of such processing difficulties, there is a tendency for the polycondensation process to reverse or not to proceed to normal completion, thereby producing an inferior quality polymer. Due to these problems and the limitations of a single screw extruder, such as limited mixing and venting capabilities, successful attempts to use a single screw extruder to polymerize various polyterephthalamides have not been reported. Unlike a twin screw extruder, a single screw extruder does not provide a high mixing shear that can eliminate the heat distribution difficulty in the extruder and does not have auxiliary ports that can be adapted to remove the volatiles produced from the polycondensation reaction. However, single screw extruders are significantly less expensive and more widely available than twin screw extruders.

The present invention provides a practical process for preparing dodecane terephthalamide polymers that can be achieved in a widely available and less expensive equipment. In addition, the present invention provides a process for preparing dodecane terephthalamide polymers that can be utilized in a manufacturing environment of a commercial scale. The present invention also provides a process for preparing dodecane terephthalamide polymers that does not require a costly vacuum or inert gas purging procedure.

SUMMARY OF THE INVENTION

According to the present invention, there is provided a process of producing a dodecane terephthalamide polymer having a high melting temperature and dimensional stability, comprising the steps of forming an aqueous suspension of a prepolymer comprising substantially equimolar diacid/diamine admixture of 1,12-dodecanediamine, and terephthalic acid in a reactor at a reaction temperature below the melting temperature of the dodecane terephthalamide polymer, wherein the resulting prepolymer has a reduced viscosity of about 0.1 to about 0.4, measured in a 0.5 g/dl solution in 96% sulfuric acid at 25° C.; drying the prepolymer; and polycondensating the dried prepolymer in an extruder to form the polyamide polymer, whereby the polyamide polymer absorbs less than 3 weight percent of moisture, based on the weight of the polyamide and moisture, and has a reduced viscosity of at least about 0.5, measured in a 0.5 g/dl solution in 96% sulfuric acid at 25° C. In addition, dodecane terephthalamide copolymers, having a high melting temperature and dimensional stability, comprising 1,12-dodecanediamine, terephthalic acid, and at least one additional compatible comonomer may be produced in accordance with the process of the present invention.

In accordance with the present invention, homopolymers and copolymers of dodecane terephthalamide can be efficaciously produced by the polycondensation process from the prepolymers of dodecane terephthalamide homopolymers and copolymers using an extruder, particularly a vented single screw extruder.

DESCRIPTION OF THE PREFERRED EMBODIMENTS

Polyamides consisting mainly of dodecane terephthalamide exhibit various useful characteristics, which include high temperature stability, low moisture sensitivity and dimensional stability, in addition to the desirable characteristics of the conventional short carbon-chain polyamides. However, dodecane terephthalamide polymers have melting points above 300° C., which are high enough to promote thermal degradation of the polymers, and, therefore, cannot be readily produced by the conventional melt polymerization process.

In accordance with the present invention, homopolymers and copolymers of dodecane terephthalamide may be prepared by an extruder polycondensation process from the prepolymers of homopolymers and copolymers of dodecane terephthalamide. Low molecular weight dodecane terephthalamide prepolymers may be prepared by a conventional batch kettle process or by a continuous reactor process known in the art. In general, the prepolymers of dodecane terephthalamide homopolymers are produced by reacting an acid/amine admixture of dodecanediamine and terephthalic acid in an aqueous environment, and the prepolymers of dodecane terephthalamide copolymers are formed from an acid/amine admixture of dodecanediamine, terephthalic acid and other compatible comonomers. These prepolymers can also be prepared from the salts of homopolymers and copolymers of dodecane terephthalamide.

In preparing the prepolymers of dodecane terephthalamides by a batch process, the reaction temperature is kept at about 200° C. to about 270° C., more preferably at about 220° C. to about 250° C., which is a temperature range substantially below the melting point of dodecane terephthalamide polymers. The prepolymer reaction is preferably carried out under an oxygen-free environment, such as under a nitrogen blanket, in a sealed reactor that is equipped with a stirring mechanism and can accommodate high pressure that accumulates inside the reactor as the sealed reactor is heated to the desired reaction temperature. Carrying out the prepolymer production under a high pressure facilitates the completion of the prepolymer formation and an oxygen-free environment prevents oxidative degradation, deterring discoloration of and gel formation in the resulting prepolymer. As is known to the art and disclosed, for example, in U.S. Pat. No. 3,509,107 to Brignac, the polymerization process is carried out in the presence of from about 0.03 to about 1.0 weight percent, based on the total weight of the substrate diacid/diamine admixture, of a phosphorous-containing compound, such as sodium hypophosphite or ammonium hypophosphite, as a polymerization catalyst and oxygen scavenger.

Upon completion of the reaction, the resulting prepolymer is precipitated out of the aqueous solution by cooling the reactor to a temperature below about 100° C., preferably below about 70° C. During the cooling process, an effective amount of additional water can be introduced to the reactor to reduce the viscosity of the prepolymer suspension in order to facilitate the discharge of the suspension from the reactor. The prepolymer precipitate is then filtered and vacuum dried prior to the polycondensation step. The resulting prepolymer has a reduced viscosity of from about 0.1 to about 0.4; more preferably, the prepolymer has a reduced viscosity of from about 0.1 to about 0.3. In accordance with the known convention in the art, a reduced viscosity for a polyamide is measured in a 0.5 g/dl solution in 96% sulfuric acid or in 99% dichloroacetic acid at 25° C. As an example, the resulting prepolymer of dodecane terephthalamide homopolymer has the formula:

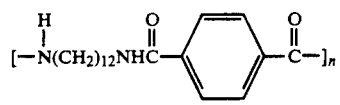

wherein n is 2 to 10, more preferably, n is 4 to 5.

As an alternate method, the prepolymers of dodecane terephthalamide can be prepared by a continuous process. This process involves polycondensing dodecane terephthalamide salt and/or copolyamide salt thereof in a co-rotating fully intermeshing twin screw extruder as described in the aforementioned European Patent Application 0 410 649.

The prepolymer polycondensation step, according to the present invention, is carried out in an extruder which acts as a continuous polycondensation reactor. The resulting polymerized dodecane terephthalamide should have a reduced viscosity of at least about 0.5; more preferably, the terephthalamide should have a reduced viscosity of at least about 0.8 in order to have sufficient molecular weight and physical integrity to be useful in the conventional polyamide applications, such as automotive and electrical parts.

When an extruder is utilized as a polycondensation reactor, the extruder provides only a minimal duration of melt residence time for prepolymers to polymerize, unlike the conventional batch reactors. Therefore, not all polyamides can be produced by an extruder polycondensation process. A successful extruder polycondensation process requires that the prepolymer has fast polycondensation kinetics and does not undergo undesirable side reactions, such as cyclization. For example, it is known in the art that nylon 4,6 cannot be polymerized in an extruder since the prepolymers tend to break down in the extruder, forming cyclic end groups with one another and reacting to form other cyclic compounds.

It has been found that the prepolymers of dodecane terephthalamides of the present invention are stable reaction products which have rapid polycondensation kinetics, making the extruder polycondensation process a suitable method of producing homopolymers and copolymers of dodecane terephthalamides. Surprisingly, the polycondensation process of the present invention can be achieved by a vented single screw extruder at a high throughput rate, unlike the prior art disclosures that require a slow throughput rate and a specialized reactor or a twin screw extruder as disclosed, for example, in the aforementioned U.S. Pat. No. 4,863,991 to Poppe et al. Furthermore, the polycondensation process of dodecane terephthalamide can be effected successfully without the need of an enhanced volatile removing process such as vacuum venting and inert gas purging. Although utilizing a twin screw extruder and providing an enhanced venting process may facilitate the polycondensation process of producing dodecane terephthalamide polymers, they are not required. In addition, since the resulting dodecane terephthalamide polymers are thermally stable, the polymers can be subjected to further passes through the extruder in order to further increase the molecular weight if an extruder with a relatively short barrel is employed or a high molecular weight polymer is desired.

The dodecane terephthalamide polymers that can be produced according to the process of the present invention include homopolymers and copolymers. Homopolymers of dodecane terephthalamide are the reaction products of 1,12-dodecanediamine and terephthalic acid. Copolymers of dodecane terephthalate are the reaction products of one or more of suitable comonomers in addition to 1,12-dodecanediamine and terephthalic acid. The preferred polyamide copolymers comprise from about 35 to about 50 mole, more preferably about 40 to about 50 mole, percent of units derived from dodecanediamine, from about 35 to about 50 mole, more preferably about 40 to about 50 mole, percent of units derived from terephthalic acid, and at least about 3 mole percent, preferably from about 4 to about 20 mole percent, of units derived from the additional comonomers.

Useful additional comonomers include units derived from monomers which are difunctional. The functional groups are groups which are reactive with the amine groups of the diamine or the acid groups of the diacid. Preferred functional groups include amine groups, hydroxyl groups and carboxylic acid groups. Specific and preferred comonomers include lactams having up to 9 methylene groups, symmetrical and nonsymmetrical aromatic diacids or diamines, and hydroxy or amine terminated polyolefins or polyethers. Depending upon the comonomer, the resulting polyamide copolymer can have high crystallinity and low moisture sensitivity, or the resulting polyamide copolymer can have significant flexibility.

A preferred copolymer that may be produced according to the process of the present invention has a relatively high melting point, high crystallinity, and has low moisture absorption characteristics. The polyamide copolymer has preferably at least about 20 percent, more preferably at least about 30 percent, of total crystallinity as measured by X-ray diffraction. Additionally, the polyamide copolymer has low moisture absorption characteristics as measured according to ASTM D 570-81. Preferably the moisture sensitivity of the polyamide copolymer is not much higher than the homopolymers of dodecane terephthalamide, that is, the polyamide copolymer absorbs less than 3 percent by weight of moisture based on the weight of the polyamide copolymer and moisture.

Preferred additional comonomers which lead to co-crystallizable segments, or at least do not significantly reduce crystallinity are diamines such as 4,9-dioxa-1,12-diaminododecane, 4,11dioxa-tetradecane-1,14-diamine, and the like; symmetrical diacids such as 2,6-naphthalene dicarboxylic acid, 4,4'-biphenyl dicarboxylic acid, dimethyl terephthalate, and the like; non-symmetrical diacids including isophthalic acid and the like; lactams having up to 9 methylene groups, preferably laurolactam and caprolactam. Copolyamides made using these additional comonomers have been found to be dimensionally stable when exposed to heat and moisture, and have chemical resistance to gasoline and alcohol as well as a variety of other organic materials. This makes the copolyamides useful for a variety of high-performance engineering resin applications, such as automotive under-the-hood parts, fuel lines, and fuel component parts.

An alternative copolyamide that may be produced according to the process of the present invention can include comonomer units that improve flexibility of the copolymer. Comonomers having a flexible hydrophobic structure resulting in a soft segment include the olefins present as polyolefin segments such as polyethylene, poly(ethylene-propylene),polyisobutylene, poly-(ethylene-butene); polyethers such as bis(aminoalkyl)-poly(alkylene ether) including bis(aminopropyl)poly(-tetrahydrafuran) and alpha,omega-bis(aminoalkyl)-poly(tetramethyleneoxide); and alpha,omega-diamino polyolefins such as telechelic, amino terminated polyethylene; and polysiloxanes such as poly(dimethyl siloxane).

The additional comonomer suitable for use in conjunction with the present invention preferably is derived from comonomers resulting in units having one or more of the following formulae:

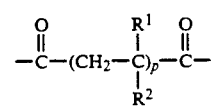

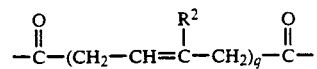

-continued

—NH—(CH$_2$)$_{x'}$—(O(CH$_2$)$_x$)$_r$—O—(CH$_2$)$_{x'}$—NH—

$$-\overset{O}{\underset{\|}{C}}-(CH_2)_5-NH-$$

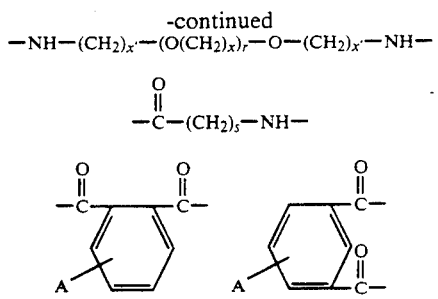

wherein $R^1$ is selected from —H, —CH$_3$, —C$_2$H$_5$, —Cl, —CH=CH$_2$, and mixtures thereof, $R^2$ is selected from —H, —CH$_3$, —C$_2$H$_5$, —CH=CH$_2$, and mixtures thereof, A is selected from —H, a halogen, and a hydrocarbon having from about 1 to about 4 carbon atoms, p is from about 5 to about 80, q is from about 10 to about 80, r is from about 1 to about 30, preferably about 5 to about 30, s is from about 4 to about 9, x is from about 4 to about 6, and x' is from about 2 to about 6.

In addition to the above monomeric constituents, other polymerizable monomers can also be used to prepare copolymers. Among these are vinyl compounds and other monomers which could be polymerized directly into a linear polymer chain.

The polyamides that may be produced in accordance with the present invention may be formed into compositions which also include one or more conventional additives, including: lubricants, heat stabilizers, coloring agents including dye and pigments, flame-retardants, fibrous and particulate fillers and reinforcing agents (both organic and inorganic), nucleating agents, ultraviolet light stabilizers, as well as other additives. These conventional additives may be incorporated into compositions at any suitable stage of the production process.

The invention will be better understood by consideration of the following examples, which are given by way of illustration and not by way of limitation of the invention.

EXAMPLES

Example 1-4

These examples are directed to the preparation of prepolymers for dodecane terephthalate homopolymers.

Example 1

Into a 1 L stainless steel autoclave equipped with a magnetically driven paddle-type stirrer, 273.4 g (1.364 moles) of 1,12-diaminododecane, 226.6 g (1.364 moles) of terephthalic acid, and 167 g of distilled water were added. After purging several times with vacuum and nitrogen, the reactor was sealed and the 75/25 monomer/water mixture was heated, with stirring, to 250° C. over a two hour period, wherein the pressure inside the reactor was 3.9 MPa (570 psi). The reaction was held at 250° C. for three hours before cooling to 60° C. in one hour. The resulting white prepolymer mixture was then removed, filtered and vacuum dried at 65° C. under a 133.3 Pa (1 mm Hg) pressure for 24 hours.

The dried prepolymer was analyzed for its water extractable content level, NH$_2$ and COOH end-group compositions, reduced viscosity, and various thermal characteristics including T$_m$ (melting temperature), T$_{ch}$ (crystalline formation temperature upon heating) and T$_{cc}$ (crystalline formation temperature upon cooling). The end-group analysis for amine and carboxylic groups was performed by the conventional titration method, and the thermal characteristics were measured in a Differntial Scanning Calorimeter. The reduced viscosity was measured in a 0.5 g/dl solution in 96% sulfuric acid at 25° C. The results are shown in Table 1 below.

Example 2

Into a 1 L stainless steel autoclave, 164.0 g(0.819 moles) of 1,12-diaminododecane, 136.0 g (0.819 moles) of terephthalic acid, 1.0 g of sodium hypophosphite as catalyst (0.25 wt. %), and 100 ml of distilled water were added. After purging several times with vacuum and nitrogen the reactor was sealed and the 75/25 monomer/water mixture was heated to 250° C. over a two hour period with stirring. It was then held at 250° C. for 3 ¾ hours. During the last ¼ hour, 300 ml of distilled water was pumped into the reactor. The reaction was cooled to 60° C. over a 1 hour period yielding a thick white slurry containing about 39% prepolymer solids. After filtration, the product was vacuum dried for 24 hours at 65° C. under a 133.3 Pa (1 mm Hg) pressure.

The dried prepolymer was analyzed for the characteristics described in Example 1. The results are shown in Table 1 below.

Example 3

After purging a mixing drum with nitrogen, it was charged with 2.00 kg (9.98 moles) of 1,12-diaminododecane, 1 66 kg (9.99 moles) of terephthalic acid, and 9.15 g (0.25 wt. %) of sodium hypophosphite. After sealing under nitrogen, the solids were mixed on a rotary mixer for 2 hours. A 11.4 L (3 gallon) stainless steel autoclave was charged with the monomer mixture and after adding 1.22 L of distilled water, the reactor was purged several times with vacuum and nitrogen. The reactor was sealed and the 75/25 monomer/water mixture was heated, with stirring, to 232° C. for a 17½ hour period. The pressure inside the reactor was 2.90 MPa (420 psi). The reaction mixture was then held at 235°-243° C., corresponding pressure was monitored to be 2.90-3.10 MPa (420-450 psi), for three hours before cooling to 60° C. over the next four hours. The white prepolymer paste was transferred to a vessel containing 5 L of warm (60° C.) distilled water, mixed well, and filtered through a fine mesh nylon cloth. The washing operation was repeated once more before vacuum drying for 24 hours at 45° C. under a 133.3 Pa (1 mm Hg) pressure.

The dried prepolymer was analyzed for the characteristics described in Example 1. The results are shown in Table 1 below.

Example 4

The procedure of Example 3 was repeated except the reaction continued for 9½ hours at 240°-245° C. and the pressure was monitored to be in the range of 3.10-3.62 MPa (450-525 psi).

The dried prepolymer was analyzed for the characteristics described in Example 1. The results are shown in Table 1 below.

TABLE 1

| Example | 1 | 2 | 3 | 4 |
|---|---|---|---|---|
| Water Soluble Content (wt %) | 1.8 | 3.5 | 0.6 | 6.1 |
| End-Group Composition | | | | |
| NH$_2$ (meq/g) | 0.766 | 1.159 | 0.691 | 0.872 |
| COOH (meq/g) | 0.899 | 1.164 | 0.743 | 0.863 |
| Reduced Viscosity | 0.18 | 0.13 | 0.198 | 0.15 |
| Thermal Characteristics | | | | |
| T$_m$ (°C.) | 270 | 283 | 297 & 304 | — |
| T$_{ch}$ (°C.) | — | 220 | — | — |
| T$_{oc}$ (°C.) | — | — | 273 | — |

Example 5-6

These examples are directed to the preparation of prepolymers for dodecane terephthalamide copolymers.

Example 5

Into a 1 L stainless steel autoclave, 216.6 g (1.081 moles) of 1,12-diaminododecane, 161.5 g (0.972 moles) of terephthalic acid, 61.9 g (0.108 moles) of a dimer of unsaturated fatty acid having 18 carbon atoms, which is marketed by Unichema Chemicals, Inc. under the trademark Pripol 1009, and 110 ml of water containing 1.1 g of sodium hypophosphite. The mixture was stirred briefly to form a uniform slurry. After purging three times with nitrogen and vacuum, the reactor was sealed under 0.07 MPa (10 psi) of nitrogen and heated, with stirring, to 240° C. over a one hour period. The pressure inside the reactor was 2.9 MPa (420 psi). The reaction was held at 240° C. for five hours before allowing the reactor to cool to room temperature. The resulting white prepolymer mixture was then removed, filtered and vacuum dried at 85° C. under a 133.3 Pa (1 mm Hg) pressure for 24 hours.

The dried prepolymer was analyzed for the characteristics described in Example 1, except the reduced viscosity was measured in 99% dichloroacetic acid. The results are shown in Table 2 below.

Example 6

The prepolymer reaction procedure of Example 5 was repeated with the following prepolymer substrates: 188.4 g (0.940 moles) of 1,12-diaminododecane, 173.6 g (1.045 moles) of terephthalic acid, 78.0 g (0.105 moles) of bis-3-aminopropyl polytetrahydrofuran, which is marketed by BASF under the trademark BAP-PTHF 750, and 110 ml of water containing 1.1 g of sodium hypophosphite.

The dried prepolymer was analyzed for the characteristics described in Example 5. The results are shown in Table 2 below.

TABLE 2

| Example | 5 | 6 |
|---|---|---|
| Water Soluble Content (wt %) | 5.1 | 6.4 |
| End-Group Composition | | |
| NH$_2$ (meq/g) | 0.915 | 1.510 |
| COOH (meq/g) | 0.955 | 0.982 |
| Reduced Viscosity | 0.19 | 0.21 |
| Thermal Characteristics | | |
| T$_m$ (°C.) | 289.5 | 291 |
| T$_{ch}$ (°C.) | 107 | 94 |

Examples 7-8

These examples are directed to the production of dodecane terephthalamide homopolymers by the extruder polycondensation process of the present invention using a single screw extruder. A Killion one-inch (2.54 cm) single screw extruder (L/D=24/1), having four zones, equipped with a Maddock mixing section and two die blocks at the end was used. The extruder was equipped with an open vent located just after the Maddock mixing section between zones 3 and 4. For Example 7, the extruder was heated to 530° F. (277° C.), 570° F. (299° C.), 590° F. (310° C.), 590° F. (310° C.) (zones 1-4); and the two die blocks were kept at 580° F. (305° C.). The screw speed was 45 RPM and gravitational flood feeding was used. For Example 8, the extruder was heated to 520° F. (271° C.), 580° F. (304° C.), 590° F. (310° C.), 600° F. (316° C.) (zones 1-4); and the die blocks were kept at 580° F. (304° C.) for the first die and at 480° F. (249° C.) for the second die. The screw speed was 50 RPM.

The prepolymer of Example 3 was polycondensed for Examples 7 and 8. The vent was closed for Example 7 and opened for Example 8. The resulting melt temperatures were 597° F. (314° C.) for Example 7 and 600° F. (315° C.) for Example 8. The end-group analysis for amine and carboxylic groups was performed by the conventional titration method, and the reduced viscosity was measured in a 0.5 g/dl solution in 96% sulfuric acid at 25° C. The results are shown in Table 3 below.

TABLE 3

| Example | Ex 7 | Ex 8 |
|---|---|---|
| Reduced Viscosity | 0.86 | 1.13 |
| % Insoluble | 0 | 0 |
| NH$_2$ (meq/g) | 0.088 | 0.044 |
| COOH (meq/g) | 0.083 | 0.084 |

As can be seen from the large increase in the reduced viscosity and the large decrease in the end-groups, the prepolymers were substantially polycondensed to form dodecane terephthalamide polymers. The resulting polymers were opaque, ductile polymers for both examples.

Example 9-10

These examples are directed to the production of dodecane terephthalamide copolymers by the extruder polycondensation process of the present invention using a single screw extruder as described in Example 7. For Example 9, the extruder was heated to 400° F. (204° C.), 480° F. (249° C.), 480° F. (249° C.), 510° F. (265° C.) (zones 1-4); and the two die blocks were kept at 560° F. (293° C.) and 520° F. (271° C.). The screw speed was 30 RPM. For Example 10, the extruder was heated to 400° F. (204° C.), 490° F. (255° C.), 490° F. (255° C.), 510° F. (265° C.) (zones 1-4); and the die blocks were kept at 560° F. (293° C.) and 520° F. (271° C.). The screw speed was 30 RPM.

The prepolymers of Examples 5 and 6 were polycondensed for Examples 9 and 10, respectively. The resulting melt temperatures were 538° F. (281° C.) for Example 9 and 545° F. (285° C.) for Example 10. The end-group analysis for amine and carboxylic groups was done by the conventional titration method, and the reduced viscosity was measured in a 0.5 g/dl solution in 99% dichloroacetic acid at 25° C. The results are shown in Table 4 below.

TABLE 4

| Example | Ex 9 | Ex 10 |
|---|---|---|
| Reduced Viscosity | 0.52 | 0.81 |
| NH$_2$ (meq/g) | 0.198 | 0.103 |
| COOH (meq/g) | 0.220 | 0.120 |

Again, the large increase in the reduced viscosity and the decrease in the end-groups of Examples 9 and 10 indicate that the prepolymers were substantially polycondensed to form dodecane terephthalamide copolymers.

Examples 11-12

These examples are directed to show the effect of re-processing (i.e., multiple passes through the extruder) the dodecane terephthalamide polymers.

The polymer from Example 8 was subjected to one additional polycondensation pass for Example 11 and two additional polycondensation passes for Example 12. The extruder temperatures were kept at the settings of Example 8, except the second die temperature was kept at 520° F. (271° C.) for Example 11 and 470° F. (243° C.) for Example 12. The polymers were fed to the extruder by the flood feeding method. The end-group analysis for amine and carboxylic groups was performed by the conventional titration method, and the reduced viscosity was measured in a 0.5 g/dl solution in 96% sulfuric acid at 25° C. The results are shown in Table 5.

TABLE 5

| Example | Ex 11 | Ex 12 |
|---|---|---|
| Reduced Viscosity | 1.51 | 1.60 |
| % Insoluble | 0 | 0 |
| NH$_2$ (meq/g) | 0.030 | 0.032 |
| COOH (meq/g) | 0.069 | 0.073 |

The above result shows that the dodecane terephthalamide polymers produced in accordance with the present invention is a stable product that can be further polycondensed to increase its molecular weight.

As can be seen from the above examples, the process of the present invention is a suitable means to produce dodecane terephthalamide polymer resins having a high melting temperature and dimensional stability. In accordance with the present invention, homopolymers and copolymers of dodecane terephthalamide can be effectively produced by the polycondensation process of the prepolymers of dodecane terephthalamide homopolymers and copolymers utilizing a conventional extruder, particularly a vented single screw extruder.

What is claimed is:

1. A process for producing a dodecane terephthalamide polymer having a high melting temperature and dimensional stability, comprising the steps of:
   a) reacting an aqueous suspension comprising substantially equimolar diacid/diamine admixture of 1,12-dodecanediamine, and terephthalic acid in a reactor to form an aqueous suspension of polyamide prepolymer at a reaction temperature of from about 200° C. to about 270° C., wherein said prepolymer has a reduced viscosity of from about 0.1 to about 0.4, measured in a 0.5 g/dl solution in 96% sulfuric acid at 25° C.;
   b) drying said prepolymer; and
   c) polycondensating said dried prepolymer in an extruder to form said polyamide polymer, whereby said polyamide polymer absorbs less than 3 weight percent of moisture, measured according to the ASTM D570-81 testing procedure, and has a reduced viscosity of at least about 0.5, measured in a 0.5 g/dl solution in 96% sulfuric acid at 25° C.

2. A process as claimed in claim 1, wherein said reactor is a sealed batch reactor equipped with a stirring mechanism.

3. A process as claimed in claim 1, wherein said prepolymer comprising substantially equimolar diacid/diamine admixture further comprises at least one additional polyamide forming comonomer.

4. A process as claimed in claim 3, wherein said prepolymer comprises polyamide units of from about 35 to about 50 mole percent of 1,12-dodecanediamine, from about 35 to about 50 mole percent of terephthalic acid, and at least 3 mole percent of said additional comonomer.

5. A process as claimed in claim 4, wherein said additional comonomer is a diacid selected from the group consisting of 2,6-naphthalene dicarboxylic acid; 4,4'-biphenyl dicarboxylic acid and dimethyl terephthalate.

6. A process as claimed in claim 4, wherein said additional comonomer is a lactam having up to 9 methylene groups in the lactam ring.

7. A process as claimed in claim 4, wherein said additional comonomer supplies a monomer unit selected from the group consisting of monomer units having the formulae:

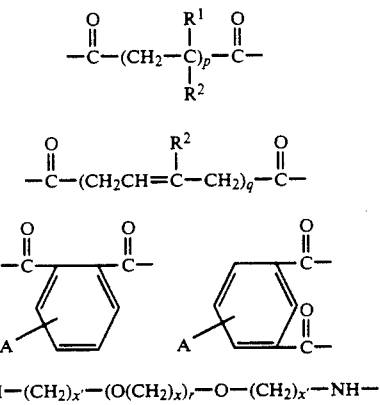

—NH—(CH$_2$)$_{x'}$—(O(CH$_2$)$_x$)$_r$—O—(CH$_2$)$_{x'}$—NH— wherein
R$^1$ is —H, —CH$_3$, —C$_2$H$_5$, —Cl or —CH=CH$_2$,
R$^2$ is —H, —CH$_3$, —C$_2$H$_5$ or —CH=CH$_2$,
A is —H, a halogen or a hydrocarbon having from 1 to 4 carbon atoms,
p is from 5 to 80,
q is from 10 to 80,
r is from 1 to 30,
x is from 4 to 6, and
x' is from 2 to 6.

8. A process for producing a dodecane terephthalamide polymer having a high melting temperature and dimensional stability, comprising the steps of:
   a) reacting an aqueous suspension comprising substantially equimolar diacid/diamine admixture of from about 35 to about 50 mole percent of 1,12-dodecanediamine, from about 35 to about 50 mole percent of terephthalic acid, and at least 3 mole percent of at least one additional polyamide forming comonomer in a reactor to form an aqueous suspension of polyamide prepolymer at a reaction temperature of from about 200° C. to about 270° C., wherein said prepolymer has a reduced viscosity of from about 0.1 to about 0.4, measured in a 0.5 g/dl solution in 99% dichloroacetic acid at 25° C.;

b) drying said prepolymer; and c) polycondensating said dried prepolymer in an extruder to form said polyamide polymer, whereby said polyamide polymer absorbs less than 3 weight percent of moisture, measured according to the ASTM D570-81 testing procedure, and has a reduced viscosity of at least about 0.5, measured in a 0.5 g/dl solution in 99% dichloroacetic acid at 25° C.

9. A process as claimed in claim 8, wherein said reactor is a sealed batch reactor equipped with a stirring mechanism.

10. A process as claimed in claim 8, wherein said additional comonomer is a diacid selected from the group consisting of 2,6-naphthalene dicarboxylic acid; 4,4'-biphenyl dicarboxylic acid and dimethyl terephthalate.

11. A process as claimed in claim 8, wherein said additional comonomer is a diamine selected from the group consisting of 4,9-dioxa-1,12-diaminododecane and 4,11-dioxa-tetradecane-1,14-diamine.

12. A process as claimed in claim 8, wherein said additional comonomer is a lactam having up to 9 methylene groups in the lactam ring.

13. A process as claimed in claim 8, wherein said extruder is a vented single screw extruder.

14. A process as claimed in claim 8, wherein said additional comonomer supplies a monomer unit selected from the group consisting of monomer units having the formulae:

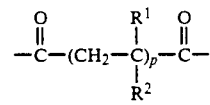

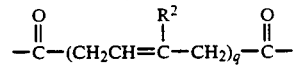

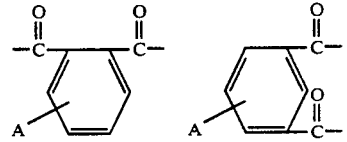

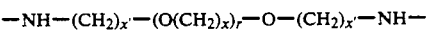

wherein
$R^1$ is —H, —CH$_3$, —C$_2$H$_5$, —Cl or —CH=CH$_2$,
$R^2$ is —H, —CH$_3$, —C$_2$H$_5$ or —CH=CH$_2$,
A is —H, a halogen, or a hydrocarbon having from 1 to 4 carbon atoms,
p is from 5 to 80,
q is from 10 to 80,
r is from 1 to 30,
x is from 4 to 6, and
x' is from 2 to 6.

* * * * *